Oct. 23, 1934.  R. ANDERSON ET AL  1,977,605
DIRECTION INDICATOR
Filed April 18, 1929   2 Sheets-Sheet 1
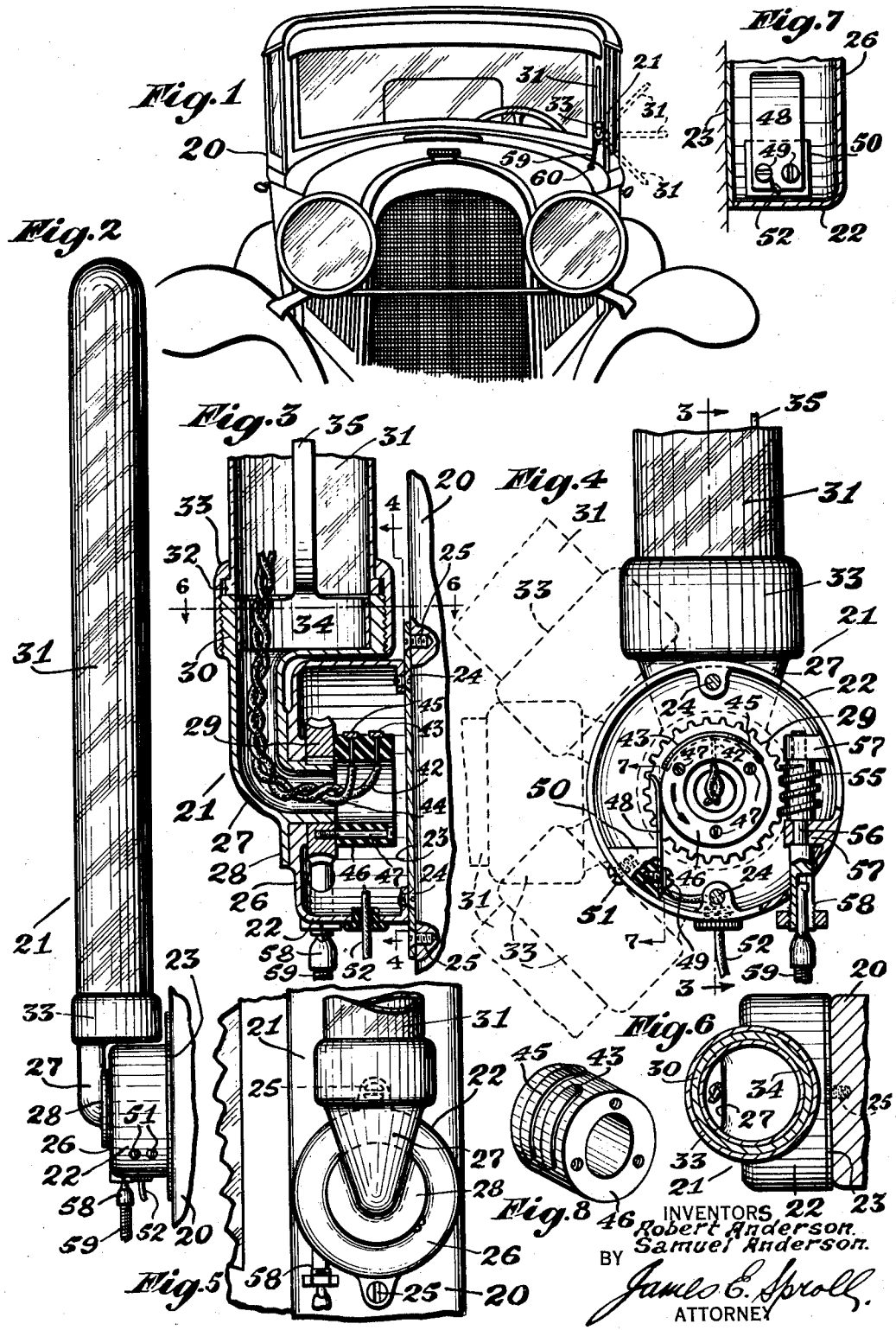

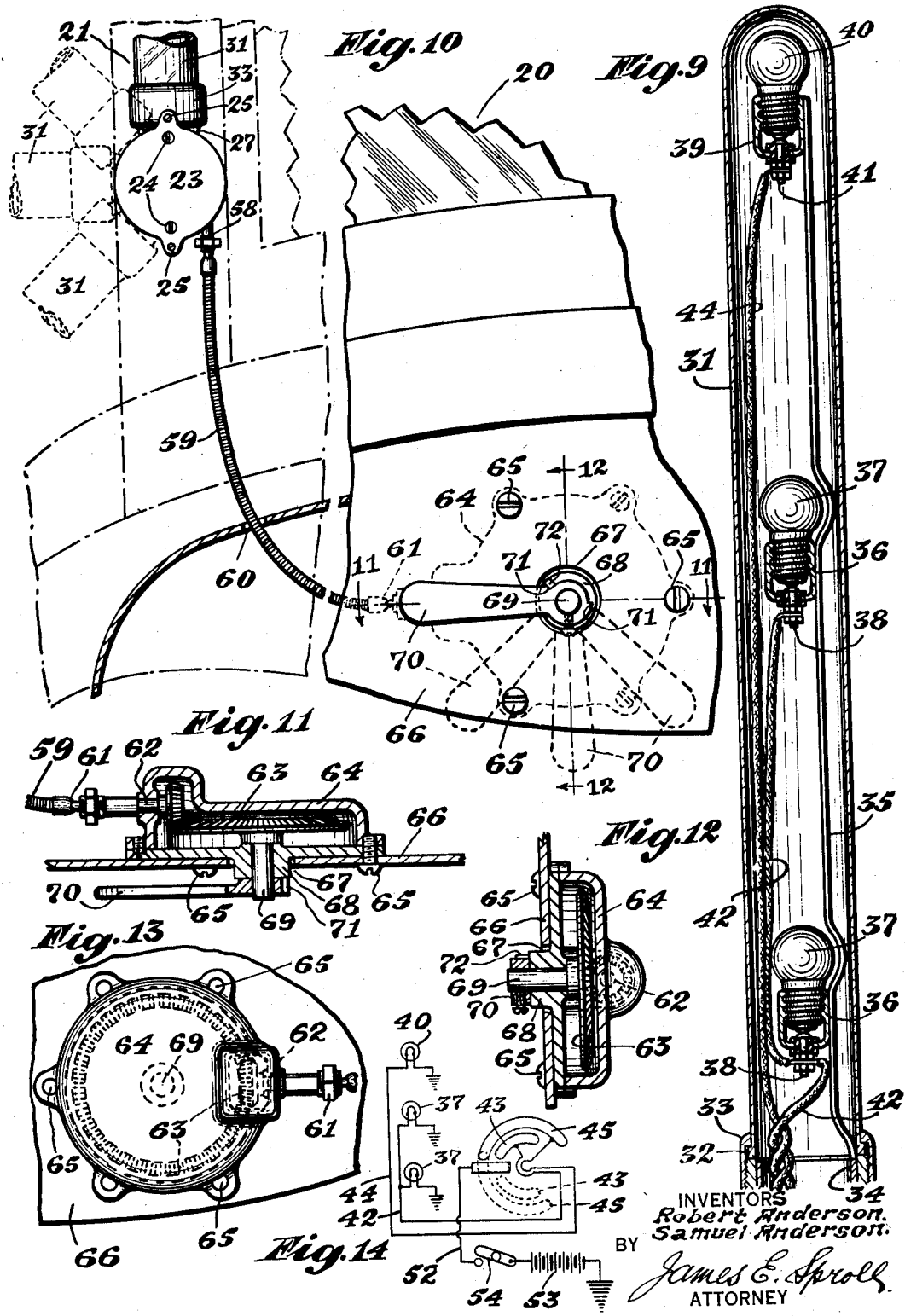

Patented Oct. 23, 1934

1,977,605

UNITED STATES PATENT OFFICE 1,977,605

DIRECTION INDICATOR

Robert Anderson and Samuel Anderson,
Seattle, Wash.

Application April 18, 1929, Serial No. 356,276

2 Claims. (Cl. 116—54)

This invention relates to improvements in direction indicators for automotive vehicles and the like and aims primarily to provide an illuminable direction indicator especially designed for clearly indicating, particularly at night, the direction in which the vehicle is to be turned, which is visible to traffic coming from any direction, which is adapted to be fully or partially illuminated as desired, and which is capable of functioning on occasion either as a direction signal or as a parking light.

Contemplated by the present invention is an automotive vehicle direction indicator embodying an oscillatable semaphore or signal arm substantially tubular in form and transparent throughout its entire length; means for oscillating said arm from any point conveniently and readily accessible to the vehicle operator; means for automatically illuminating said arm, said means being adapted to selectively regulate the amount of illumination of the arm in different signalling positions; and means for rendering said illuminating means inactive during day driving, all of which are important objects of the invention and are to be correlated in the broad aim of enhancing the efficiency of the indicator for general use.

The above, and additional objects which will hereinafter be more specifically treated are attained by such means as are shown in the accompanying drawings, described in the following specification and then more clearly pointed out in the claims, which are appended hereto and form a part of this application.

With reference to the drawings, in which there is illustrated one embodiment of the invention, and throughout the several views of which like characters of reference designate similar parts;

Figure 1 is a front elevation of an automotive vehicle equipped with the direction indicator comprehended by the present invention.

Fig. 2 is a side elevation of the indicator, as it would appear when in an inactive or retracted position.

Fig. 3 is an enlarged fragmentary vertical longitudinal section of the lower portion of the indicator taken substantially through line 3—3 of Fig. 4.

Fig. 4 is a vertical transverse section of the same taken through line 4—4 of Fig. 3, certain parts being broken away and certain other parts being shown in section for clarity of illustration, the several operative positions of the indicator being illustrated by dotted lines.

Fig. 5 is an enlarged fragmentary front elevation of the lower portion of the indicator.

Fig. 6 is a horizontal section taken through line 6—6 of Fig. 3.

Fig. 7 is a fragmentary vertical section taken longitudinally through line 7—7 of Fig. 4.

Fig. 8 is a perspective view of the illuminating or lighting circuit make and break device, as it would appear when detached from the indicator.

Fig. 9 is a vertical medial section of the hollow transparent semaphore or signal arm, illustrating more clearly the manner of illuminating the same.

Fig. 10 is a rear view of the indicator and its actuating mechanism, illustrating the manner of mounting the latter upon the cowl or dash of the automotive vehicle.

Fig. 11 is a horizontal section taken transversely through line 11—11 of Fig. 10.

Fig. 12 is a vertical section taken longitudinally through line 12—12 of Fig. 10.

Fig. 13 is a front elevation of the indicator actuating mechanism, and

Fig. 14 is a diagrammatic view of the illuminating or lighting circuit of the indicator.

Beginning now the more detailed description of the invention by reference to the drawings, the numeral 20 designates an automotive vehicle, of any well known type, to the windshield frame of which is adapted to be attached the direction indicator of the invention generally designated by the numeral 21.

In its present embodiment the direction indicator 21 comprises a relatively short cylindrical casing or hollow base 22 having an open rear end adapted to be normally closed by a disk-shaped closure plate 23, which latter is detachably secured thereto by screws 24, and serves and functions thereat as a means for attaching the direction indicator 21 to the vehicle 20, and for this purpose said plate is adapted to be detachably secured to the vehicle by screws 25.

The casing 22 is provided with a forward end wall 26, within which is concentrically mounted for oscillative movement the lower or inner end of an upwardly flaring hollow elbow 27, said lower end being provided exteriorly of the wall 26 with a flange 28 for normal abutment with said wall to thereby form a water-tight joint therebetween. The lower end of the elbow 27 extends within the casing 22 to receive upon its inner terminal portion a worm wheel 29, which latter is splined or keyed thereon and normally abuts the inner side of the front wall 26, whereby such wheel conjointly with the flange 28 functions to positively prevent axial movement of the elbow 27 within said wall 26, as will be manifest and apparent by referring to Fig. 3.

Formed in inwardly offset relation upon the upper flaring end of the elbow 27 is an exteriorly threaded hollow boss 30, which latter is adapted to normally overlap the casing 22, substantially in the manner illustrated in Figs. 2 and 3, for a purpose which will hereinafter be made more apparent.

Normally abutting the outer end of the boss 30 and extending therefrom in axial prolongation thereto is a tubular semaphore or signal arm 31, fabricated from substantially transparent or semi-transparent material, which will not readily shatter, such as celluloid, isinglass, or the like, said material being preferably red in color, in order to render the semaphore arm 31 more conspicuous during signalling operations. The semaphore arm 31 is preferably formed with a semispherical closed outer end, as shown in Figs. 2 and 9, and at its inner or open end is provided, as shown in Figs. 3 and 9, with a peripheral or exterior shoulder 32 engageable by an interiorly shouldered cylindrical nut 33, which is threadedly connected to the exteriorly threaded boss 30, whereby the semaphore arm is detachably secured thereto, as will be readily understood by referring to Fig. 3.

Snugly fitting within the hollow boss 30 is an annular band 34 having a relatively narrow strip 35 connected thereto and projecting outwardly therefrom, which strip extends within the semaphore arm 31, substantially the full length thereof in spaced parallel relation to its interior walls, as shown more clearly in Fig. 9.

Fixedly secured to the strip 35 at a point thereon adjacent its inner end and at a point thereon substantially midway the length thereof, are interiorly threaded sockets 36 adapted to threadedly receive light bulbs or globes 37, which bulbs are grounded within the sockets 36, by reason of their threaded connection therewith, and at their inner ends are adapted to contact with and receive electric current from buttons 38, mounted in and insulated from the inner closed ends of the sockets 36. Similarly secured to the outer end of the strip is an interiorly threaded socket 39 adapted to receive a light bulb 40, which is also grounded in its socket 39 and receives electric current from a button 41 mounted in and insulated from the socket 39, in the identical manner to that hereinbefore described for the sockets 36 and bulbs 37.

The buttons 38 are connected by a common lead 42 to an arcuate shoe or ring segment 43 and the button 41 is connected by a lead 44 to a slightly longer arcuate shoe or ring segment 45, said shoes 43 and 45 being circumferentially seated in spaced parallel relation within the periphery of an oscillative insulating sleeve 46, with the forward ends of the shoes in alignment substantially in the manner indicated in Fig. 8. The sleeve 46 is adapted to be rigidly secured in axially aligned relation by screws 47 to the rear face of the worm wheel 29 for oscillation therewith.

Normally abutting the periphery of the sleeve 46 and adapted to simultaneously contact with the forward ends of the shoes 43 and 45, is a brush or plate 48, which is fixedly secured by screws 49 to a block of insulation 50 similarly secured to the inner walls of the casing 22 by screws 51, as shown more clearly in Fig. 4, said brush 48 being connected by a lead 52 to the battery 53 of the vehicle 20, see Fig. 14, or any other suitable source of energy. Interposed within the lead 52 is a switch 54 for rendering the lighting circuits of the semaphore arm 31 inactive during day driving if desired.

Oscillation or actuation of the semaphore arm 31 is effected by mechanism about to be described. Meshing with the worm wheel 29 is a worm 55 fixedly secured to a shaft 56 rotatively mounted within spaced bearings 57 formed upon the interior walls of the casing 22, said shaft being adapted at its lower end to extend outwardly from said casing, and is provided thereat with a coupling 58 for connecting the upper end of a flexible shaft 59 thereto, which latter extends downwardly from said coupling through an opening 60 formed in the vehicle hood, see Figs. 1 and 10, and at its lower end is connected by a similar coupling 61 to the pinion shaft 62 of bevel gearing 63, enclosed within a sectional gear housing 64 rigidly secured, as by screws 65, to the underside of the vehicle dash or cowl 66, which is apertured, as at 67, to accommodate an exteriorly bossed portion 68 of the housing 64, wherethrough the bevel gear shaft 69 of the bevel gearing 63 extends, said shaft having an oscillative actuating handle or lever 70 rigidly secured to its outer or rear end, oscillative movement of which is limited by shoulders 71 formed thereon abutting a stop pin 72 rigidly secured to and projecting outwardly from the bossed portion 68.

To actuate the direction indicator of the present invention, the vehicle operator grasps the handle 70 and turns same in a counterclockwise direction from its fully retracted position indicated in full lines in Fig. 10, to any of the desired signalling positions indicated in dotted lines in said Figure, the first dotted position indicating a right turn, the second a left turn and the third stop or parking position. The partial rotative movement of the handle 70 is imparted through the bevel gearing 63, flexible shaft 59, worm 55 and worm wheel 29 to the semaphore arm 31, to thus move the same into the desired signalling position, the various signalling positions of which are indicated in dotted lines in Figs. 1, 4 and 10. It is to be here noted that the gear ratios of the bevel gearing and worm gearing, herein shown and described, are such that angular movements of the actuating handle 70 and semaphore arm 31 are identical, so that the position of the handle 70 indicates the corresponding position of the semaphore arm 31.

During initial angular movement of the semaphore arm 31 from a fully retracted position, as above described, the forward ends of the shoes 43 and 45 are brought into contact with the brush 48, thereby automatically closing the circuits of the light bulbs 37 and 40, and with the switch 54 closed, as in night driving, the bulbs 37 and 40 are lighted to illuminate the semaphore throughout its entire length. The shoes 43 and 45 remain in contact with the brush 48 until the semaphore arm 31 has almost reached its fully advanced position, when the shoe 43 passes out of contact with the brush 48, the shoe 45 remaining in contact therewith, whereby the outer end only of said semaphore arm is illuminated by the bulb 40, this for the purpose of furnishing a parking light. Upon return movement of the actuating handle 70 the semaphore arm 31 is returned to its inactive position with its lighting circuits opened.

In the foregoing description and in the accompanying drawings the actuating mechanism of the present direction indicator has been described and shown as mounted upon the vehicle cowl or dash 66, but, it is to be understood that such mechanism may be attached to the vehicle steering post or to any other convenient and accessible part of the vehicle 20.

Manifestly, therefore, the direction indicator of the present invention is extremely simple, compact, durable, economical and weatherproof in construction; is efficient, positive and reliable in use and operation; is adapted for easy and expeditious attachment to any type of automotive vehicle; is readily and conveniently accessible to the operator; is especially designed for rapid actuation to any signalling position; will not readily get out of order; and due to its mode of construction is plainly visible at night either as a direction indicator, or as a parking light.

While, we have herein shown and described the invention with sufficient detail, to enable those skilled in the art to which it pertains, to understand the mode of construction and the principles involved, it is to be understood that there is no intentional limitation herein to the specific form and precise details of construction shown and described, except as expressly defined by the appended claims, and that various modifications of the same may be resorted to without departing from the spirit of the invention or the benefits derivable therefrom. It is also to be understood that certain features of the invention herein disclosed may be employed in other combinations than those shown and described.

What we claim as our invention, and desire to secure by Letters Patent is:—

1. A direction indicator comprising a casing having an end wall, an oscillative elbow having one arm thereof journalled in and extending through the end wall of said casing and having an exteriorly threaded terminal on its other arm, a direction indicator column having an exteriorly shouldered inner end adapted to normally abut said terminal and to extend therefrom in axial prolongation thereto, an interiorly shouldered and threaded collar adapted to encase and abut said exteriorly shouldered end and to threadedly engage said exteriorly threaded terminal whereby said column is detachably secured to said elbow for joint oscillative movement therewith, means for illuminating said column, and means for effecting oscillation of the elbow and column to move the latter to its various direction indicating positions.

2. A direction indicator comprising a cylindrical casing having an end wall, an oscillative elbow having one arm thereof concentrically journalled in and extending through the end wall of said casing, said arm having a flange normally in abutment with the outer surface of said end wall, a direction indicator column having an exteriorly shouldered inner end adapted to normally seat upon the outer end of the other arm of said elbow and to extend therefrom in axial prolongation thereto, an interiorly shouldered collar adapted to encase said exteriorly shouldered end of said column and the outer end portion of said last mentioned arm, means for detachably securing said collar to said elbow whereby said column jointly oscillates therewith, means for illuminating the column, and means for effecting oscillation of the elbow and column to move the latter to its various direction indicating positions.

ROBERT ANDERSON.
SAMUEL ANDERSON.